(12) United States Patent
Kim et al.

(10) Patent No.: US 8,759,477 B2
(45) Date of Patent: Jun. 24, 2014

(54) POLYSILOXANE-POLYLACTIDE BLOCK COPOLYMER AND PREPARATION METHOD THEREOF

(71) Applicant: LG Chem, Ltd., Seoul (KR)

(72) Inventors: Seong-Woo Kim, Seoul (KR); Seung-Young Park, Daejeon (KR); Sung-Cheol Yoon, Daejeon (KR); In-Su Lee, Seoul (KR); Do-Yong Shim, Gyeonggi-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/952,302

(22) Filed: Jul. 26, 2013

(65) Prior Publication Data

US 2013/0317181 A1    Nov. 28, 2013

Related U.S. Application Data

(62) Division of application No. 13/698,610, filed as application No. PCT/KR2011/005854 on Aug. 10, 2011.

(30) Foreign Application Priority Data

Aug. 10, 2010 (KR) .......................... 10-2010-0077036

(51) Int. Cl.
*C08G 63/82* (2006.01)
*C08G 77/445* (2006.01)
*C08G 77/08* (2006.01)

(52) U.S. Cl.
USPC ............... 528/357; 528/12; 528/18; 528/283; 525/474

(58) Field of Classification Search
USPC ............................. 528/12, 18, 283; 525/474
See application file for complete search history.

(56) References Cited

FOREIGN PATENT DOCUMENTS

| | | |
|---|---|---|
| JP | 2984374 | 9/1999 |
| KR | 19990069033 A | 9/1999 |
| KR | 10-2008-0045690 | 5/2008 |
| KR | 20090063147 A | 6/2009 |
| KR | 10-2009-0123866 | 12/2009 |
| KR | 20100121120 A | 11/2010 |
| WO | 94/19384 | 9/1994 |

OTHER PUBLICATIONS

Stereocomplexes of A-B-A Triblock Copolymers Based on Poly (L-Lactide) and Poly (D-Lactide) A Blocks; Kricheldorf et al; Macromolecules, 2005, Col. 38 pp. 7018-7025.
"Synthesis and characterization of poly (lactide-b-siloxane-b-lactide) copolymers as magnetite nanoparticle disperants"; Ragheb, et al; Polymer, 2008, vol. 49, pp. 5397-5404.
Chang-Hong Ho et al. "Synthesis and characterization of (AB)N-type poly(L-lactide)-poly(dimethyl siloxane) multiblock copolymer and the effect of its macrodiol composition on urethane formation", European Polymer Journal 45 (2009) 2455-2466.

*Primary Examiner* — Randy Gulakowski
*Assistant Examiner* — Christopher M Rodd
(74) *Attorney, Agent, or Firm* — McKenna Long & Aldridge, LLP

(57) ABSTRACT

The present invention relates to a polysiloxane-polylactide block copolymer and a preparation method thereof, in which the polysiloxane-polylactide block copolymer has improved impact resistance and flexibility, compared to the conventional polylactide resins and can be prepared by ring-opening polymerization of lactide monomers in the presence of a polymerization initiator of polysiloxane.

10 Claims, 2 Drawing Sheets

POLYSILOXANE-POLYLACTIDE BLOCK COPOLYMER AND PREPARATION METHOD THEREOF

This application is a Divisional of U.S. application Ser. No. 13/698,610, filed Nov. 16, 2012, which is a National Stage Entry of International Application No. PCT/KR2011/005854, filed Aug. 10, 2011, which claims benefit of Korean Application No. 10-2010-0077036, filed on Aug. 10, 2010, all of which are hereby incorporated by reference in its entirety for all purposes as if fully set forth herein.

FIELD OF THE INVENTION

The present invention relates to a polysiloxane-polylactide block copolymer and a preparation method thereof, and more particularly, to a polysiloxane-polylactide block copolymer that exhibits a low tensile modulus to have high flexibility and excellent impact resistance, and a preparation method thereof.

BACKGROUND OF THE INVENTION

Polylactide (or poly lactic acid) resins are a kind of resin containing a repeating unit of the following Formula 1. Unlike the existing petroleum-based products, these polylactide resins are based on biomass, and thus they have environment-friendly features such that they can be used as a renewable resource, and showing low carbon dioxide emissions that contribute to global warming during their production, compared to other resins, and being biodegradable in the presence of moisture and microorganisms, as well as having suitable mechanical strength equivalent to the existing known petroleum-based products.

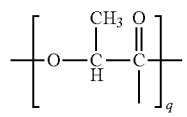

[Formula 1]

These polylactide resins have been mainly used for disposable packaging/containers, coatings, foam products, films/sheets, and fabric. Recently, there have been many trials of use of the polylactide resins as semi-permanent materials for mobile phone bodies or car interior parts, after their physical properties are improved by mixing the polylactide resins with known resins such as ABS, polycarbonate, and polypropylene. However, their application is still limited because the polylactide resins have a weak physical property of biodegradation by factors such as catalysts used in their production or moisture in air.

Further, although the polylactide resins have an advantage of showing relatively high mechanical strength, they are problematic in that they have a relatively high glass transition temperature of room temperature or higher (Tg, 50~60° C.) and thus become brittle when applied to film or sheet products because of reduced resin flexibility after thermal processing. Furthermore, due to their low impact resistance, their application is still limited. Until now, in order to improve elasticity, there have been many trials in which the resins are compounded with organic materials such as rubber or branches are introduced into the main chain of polylactide, but the effects are still unsatisfactory.

SUMMARY OF THE INVENTION

The present invention provides a polysiloxane-polylactide block copolymer including repeating units of the following Chemical Formula 1 and 2:

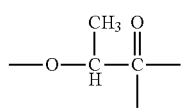

[Chemical Formula 1]

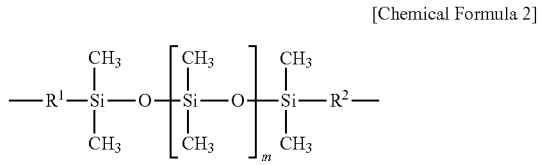

[Chemical Formula 2]

wherein m is an integer of 5 to 150, and $R^1$ and $R^2$ are the same as or different from each other and are each independently substituted or unsubstituted alkyl having 3 to 10 carbon atoms, substituted or unsubstituted cycloalkyl having 3 to 10 carbon atoms, or substituted or unsubstituted aryl having 6 to 10 carbon atoms.

The polysiloxane-polylactide block copolymer comprises 1 to 30% by weight of the repeating unit of Chemical Formula 2.

The polysiloxane-polylactide block copolymer has a weight average molecular weight of 50,000 to 1,000,000 g/mol.

The polysiloxane-polylactide block copolymer has the tensile modulus measured according to ASTM D638 of 2.5 GPa or less.

The polysiloxane-polylactide block copolymer has the tensile strength measured according to ASTM D638 of 100 to 700 Kg/cm² and the elongation measured according to ASTM D638 of 2 to 20%.

The polysiloxane-polylactide block copolymer has notched Charpy impact strength measured according to ASTM D256 of 5 to 50 Kgf·m/m.

Further, the present invention provides a preparation method of the polysiloxane-polylactide block copolymer, including the step of ring-opening polymerization of lactide monomers in the presence of a polysiloxane compound of the following Chemical Formula 3:

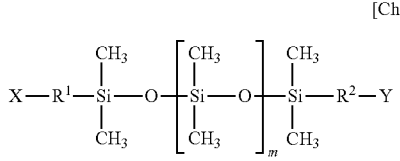

[Chemical Formula 3]

wherein m is an integer of 5 to 150, $R^1$ and $R^2$ are the same as or different from each other and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms, and X and Y are each independently an alkoxy group having 1 to 12 carbon atoms or a hydroxyl group.

The polysiloxane compound of Chemical Formula 3 is added in an amount of 1 to 50 parts by weight, based on 100 parts by weight of the lactide monomer.

The polysiloxane compound of Chemical Formula 3 has a number average molecular weight of 300 to 30,000 g/mol.

The ring-opening polymerization of lactide monomers is performed in the presence of an organic metal complex catalyst of the following Chemical Formula 4:

[Chemical Formula 4]

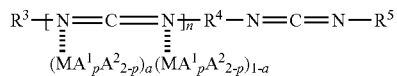

wherein n is an integer of 0 to 15; p is an integer of 0 to 2; a is 0 or 1; M is Sn or Zn; $R^3$ and $R^5$ are the same as or different from each other, and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms; $R^4$ is substituted or unsubstituted alkylene having 3 to 10 carbon atoms, substituted or unsubstituted cycloalkylene having 3 to 10 carbon atoms, or substituted or unsubstituted arylene having 6 to 10 carbon atoms; and $A^1$ and $A^2$ are each independently an alkoxy group having 1 to 12 carbon atoms or a carboxyl group.

The ring-opening polymerization of lactide monomers is performed in the presence of a catalyst including compounds of the following Chemical Formula 5 and 6:

[Chemical Formula 5]

$$R^3 + N = C = N - R^4 + _n N = C = N - R^5$$

wherein n is an integer of 0 to 15; $R^3$ and $R^5$ are the same as or different from each other, and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms;

$R^4$ is substituted or unsubstituted alkylene having 3 to 10 carbon atoms, substituted or unsubstituted cycloalkylene having 3 to 10 carbon atoms, or substituted or unsubstituted arylene having 6 to 10 carbon atoms;

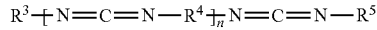 [Chemical Formula 6]

wherein M is Sn or Zn, p is an integer of 0 to 2, and $A^1$ and $A^2$ are each independently an alkoxy group having 1 to 12 carbon atoms or a carboxyl group.

In the Chemical Formula 5 and 6, $R^3$ and $R^5$ are each independently a monovalent phenyl group substituted with an alkyl group having 1 to 10 carbon atoms, or an alkyl or cycloalkyl group having 3 to 10 carbon atoms, and $R^4$ is a bivalent phenylene group substituted with an alkyl group having 1 to 10 carbon atoms or an alkylene or cycloalkylene group having 3 to 10 carbon atoms.

The compound of Chemical Formula 6 is tin(II) 2-ethylhexanoate($Sn(Oct)_2$).

The organic metal complex catalyst of Chemical Formula 4 is added at a ratio of 0.001 to 0.1 mole, based on 100 moles of the lactide monomer.

Each of the compounds of Chemical Formula 5 and 6 is added at a ratio of 0.001 to 0.1 mole, based on 100 moles of the lactide monomer.

In the preparation method of polysiloxane-polylactide block copolymer, an initiator including a hydroxyl-containing compound is added at a ratio of 0.001 to 1 mole, based on 100 moles of the lactide monomer, so as to perform the ring-opening polymerization.

The ring-opening polymerization is performed by bulk polymerization.

The ring-opening polymerization is performed at a temperature of 120 to 200° C. for 0.5 to 8 hours.

DETAILED DESCRIPTION OF THE EMBODIMENT

Figure 1:
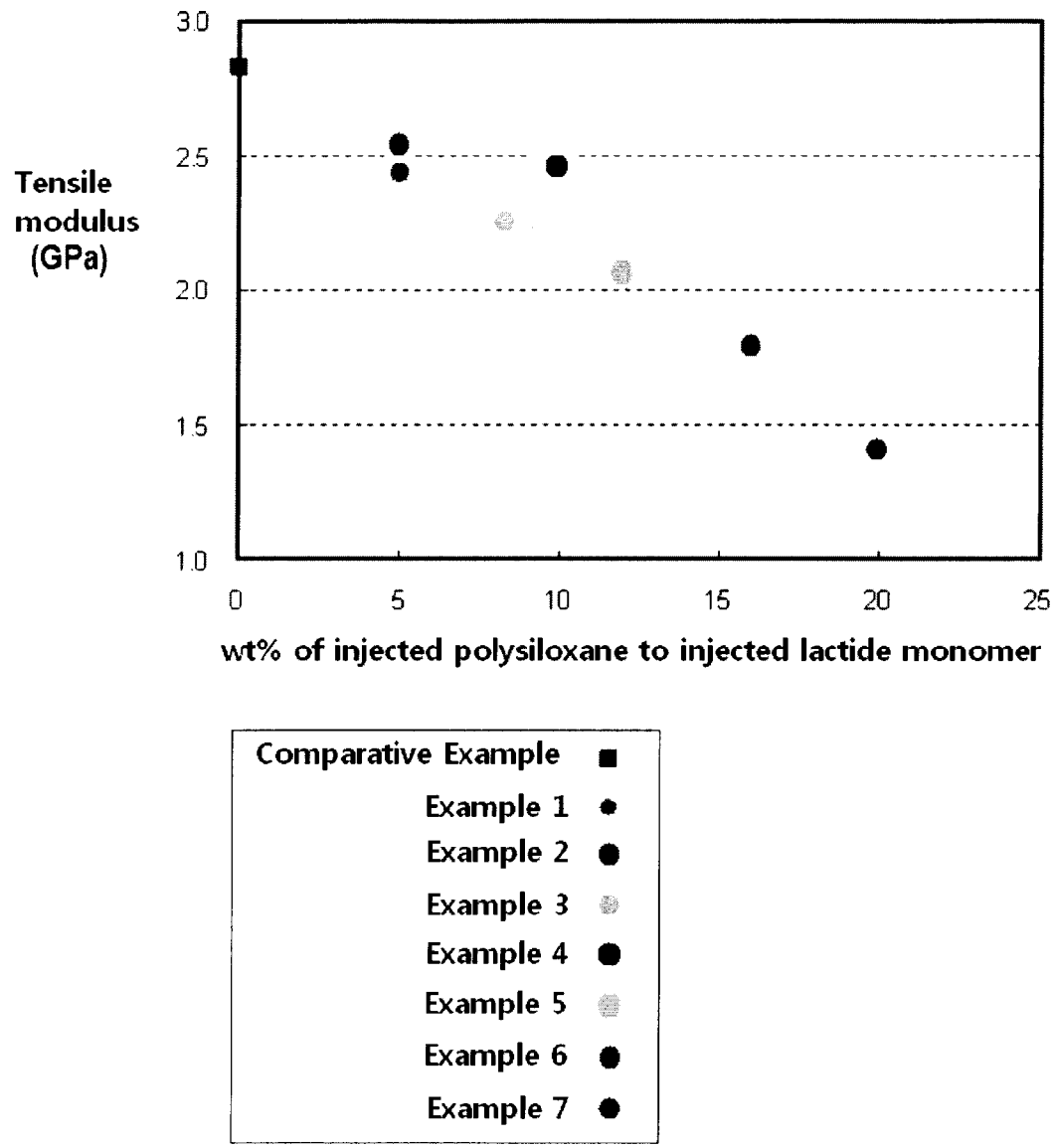
FIG. 1 shows comparison of tensile modulus values between the polylactide resin according to a comparative example and the polysiloxane-polylactide block copolymers according to examples.
Figure 2:
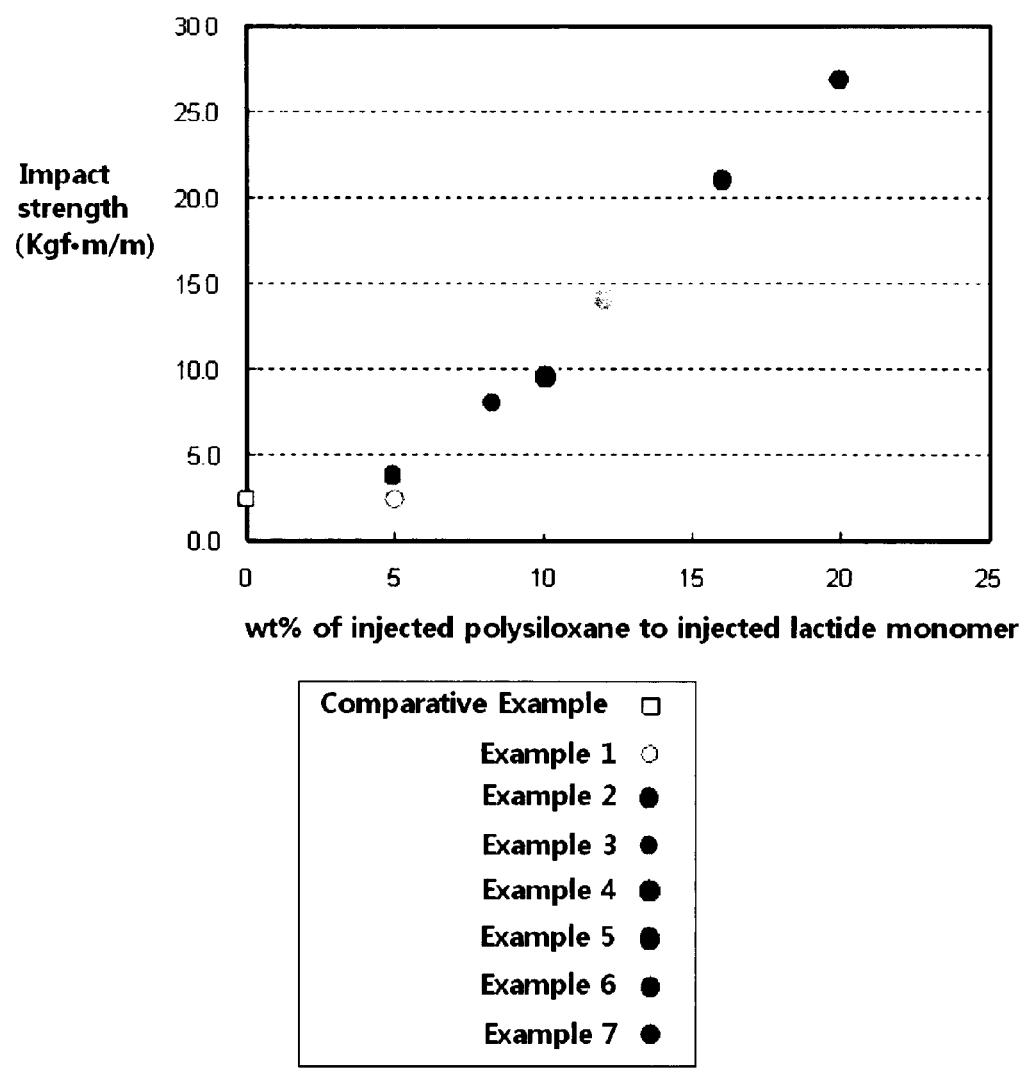
FIG. 2 shows comparison in impact strength values between the polylactide resin according to the comparative example and the polysiloxane-polylactide block copolymers according to the examples.

Hereinbelow, the polysiloxane-polylactide block copolymer and preparation method thereof according to specific embodiments of the present invention will be described.

Unless otherwise specified, the terms used herein shall be defined as follows.

Unless otherwise specified, the term "comprising" or "including", as used herein, means to include any elements (or components) without limitation, but do not preclude the addition of other elements (or components).

Further, the term "lactide monomer", as used herein, may be defined as follows. Typically, lactide may be classified into L-lactide composed of L-lactic acid, D-lactide composed of D-lactic acid, and meso-lactide composed of one L-lactic acid and one D-lactic acid. In addition, a 50:50 mixture of L- and D-lactide is called D,L-lactide or rac-lactide. Among them, when only L-lactide or D-lactide having high optical purity is used to perform polymerization, L- or D-polylactide (PLLA or PDLA) with very high tacticity is known to be obtained. Such polylactides are also known to have a high crystallization rate and crystallinity, compared to polylactides having low optical purity. However, the term "lactide monomer", as used herein, is defined to include all types of lactides, regardless of property differences of each lactide and polylactide prepared therefrom.

The term "polysiloxane-polylactide block copolymer", as used herein, refers to a polysiloxane-polylactide block copolymer including the repeating unit of Chemical Formula 1 and the repeating unit of Chemical Formula 2, and the "polysiloxane-polylactide block copolymer" may be prepared by a method including the step of forming the repeating units of Chemical Formula 1 and 2 by ring-opening polymerization of "lactide monomers" in the presence of the polysiloxane of Chemical Formula 3, as described above. The polymer, which is prepared after completion of the ring-opening polymerization and the formation process of the following repeating units, may be referred as the "polysiloxane-polylactide block copolymer". In this regard, the "lactide monomer" encompasses all types of lactides, as described above.

The polymer designated as the "polysiloxane-polylactide block copolymer" encompasses all types of polymers that are prepared after completion of the ring-opening polymerization and the formation process of the repeating units, for example, an unrefined or refined polymer after completion of the ring-opening polymerization, a polymer included in a liquid or solid resin composition before molding of products, a polymer included in a plastic or fabric after molding of products, or the like. Throughout the present invention, therefore, physical properties (weight average molecular weight, etc.) of the "polysiloxane-polylactide block copolymer" may be defined by the physical properties of any polymer that is prepared after completion of the ring-opening polymerization and the formation process of the repeating units.

According to one embodiment of the present invention, a polysiloxane-polylactide block copolymer including the repeating unit of the following Chemical Formula 1 and the repeating unit of the following Chemical Formula 2 is provided:

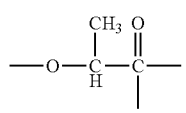

[Chemical Formula 1]

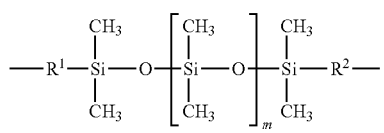

[Chemical Formula 2]

wherein m is an integer of 5 to 150, and R1 and R2 are the same as or different from each other and are each independently substituted or unsubstituted alkyl having 3 to 10 carbon atoms, substituted or unsubstituted cycloalkyl having 3 to 10 carbon atoms, or substituted or unsubstituted aryl having 6 to 10 carbon atoms.

As a result of intensive studies, the present inventors found that a block copolymer including the lactide-based repeating unit of Chemical Formula 1 and the polysiloxane repeating unit of Chemical Formula 2 has excellent flexibility and mechanical properties, and the block copolymer can also be prepared by the step of ring-opening polymerization of lactide monomers in the presence of the polysiloxane compound of Chemical Formula 3, as described below.

Specifically, the Si—O bond of the polysiloxane repeating unit of Chemical Formula 2 has low rotation energy in its chemical structure, which reduces the glass transition temperature (Tg) of the polysiloxane-polylactide block copolymer including the same, leading to improvement of flexibility.

Further, as described in the following preparation method, when the ring-opening polymerization of lactide monomers is performed in the presence of the polysiloxane compound having a terminal hydroxyl or alkoxy group of the following Chemical Formula 3, the aforementioned polysiloxane-polylactide block copolymer can be simply prepared without an additional polymerization initiator:

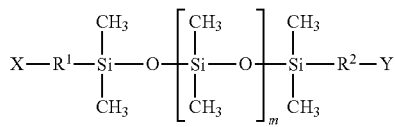

[Chemical Formula 3]

wherein m is an integer of 5 to 150, $R^1$ and $R^2$ are the same as or different from each other and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms, and X and Y are each independently an alkoxy group having 1 to 12 carbon atoms or a hydroxyl group.

As supported by the following examples, it was found that the value of tensile modulus decreases with an increase in the content of the polysiloxane included in the polysiloxane-polylactide block copolymer, leading to improvement of flexibility and a linear increase in the mechanical properties such as impact strength.

Meanwhile, in order to optimize other physical properties such as elongation of the polysiloxane-polylactide block copolymer, the block copolymer may include the repeating unit of Chemical Formula 2 in an amount of 1 to 30% by weight, and more preferably 5 to 20% by weight.

Further, the polysiloxane-polylactide block copolymer has a weight average molecular weight of 50,000 to 1,000,000 g/mol, preferably 100,000 to 1,000,000 g/mol, and most preferably 100,000 to 300,000 g/mol.

Meanwhile, the polysiloxane-polylactide block copolymer is excellent in terms of mechanical properties as well as flexibility. In particular, its tensile modulus measured according to ASTM D638 may be 2.5 GPa or less. The tensile modulus means a force required to stretch a specimen. Thus, a lower tensile modulus means that the specimen can be stretched by a smaller force, that is, it has an increase in flexibility of the block copolymer.

As described above, the conventional biodegradable polylactide resins have attracted much attention owing to relatively excellent mechanical properties, but it is difficult to apply them to various products because of high value of tensile modulus, that is, its brittleness. On the other hand, since the polysiloxane-polylactide block copolymer according to one embodiment of the present invention is able to solve the problem of brittleness of the conventional polylactide resins, its application fields are expected to be expanded.

The polysiloxane-polylactide block copolymer according to one embodiment of the present invention exhibits excellent flexibility, and also excellent mechanical properties. In particular, with respect to the polysiloxane-polylactide block copolymer, its tensile strength measured according to ASTM D638 may be 100 to 700 Kg/cm², its elongation measured according to ASTM D638 may be 2 to 20%, and its notched Charpy impact strength measured according to D256 may be 5 to 50 Kgf·m/m. Thus, the polysiloxane-polylactide block copolymer exhibits sufficient mechanical strength, and therefore it is applicable to various products.

Meanwhile, according to another embodiment of the present invention, a method of preparing the polysiloxane-polylactide block copolymer including the step of ring-opening polymerization of lactide monomers in the presence of a polysiloxane compound of the following Chemical Formula 3 is provided:

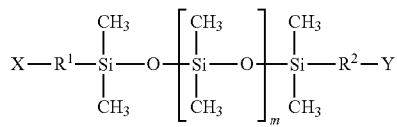

[Chemical Formula 3]

wherein m is an integer of 5 to 150, $R^1$ and $R^2$ are the same as or different from each other and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms, and X and Y are each independently an alkoxy group having 1 to 12 carbon atoms or a hydroxyl group.

In general, polylactide resin polymerization by ring-opening polymerization of lactide monomers is initiated by the compound having a terminal hydroxyl group, and continuous ring opening of lactide monomers occurs with insertion. Therefore, when the terminal hydroxyl group of the polysiloxane compound of Chemical Formula 3 is added to the ring-opening polymerization of lactide monomers, the lactide monomer is inserted at the end of the polysiloxane, and consequently the polysiloxane-polylactide block copolymer is prepared.

As described above, when the ring-opening polymerization of lactide monomers is performed in the presence of the polysiloxane compound having a terminal hydroxyl and/or alkoxy group of Chemical Formula 3, the polysiloxane compound functions as a polymerization initiator and is also included in the block copolymer as a repeating unit, thereby improving flexibility and mechanical properties such as impact strength of the final block copolymer.

In this regard, the amount of the polysiloxane compound of Chemical Formula 3 used in the ring-opening polymerization may be determined within a proper range, considering the content of the polysiloxane repeating unit included in the final block copolymer and the molar ratio of the hydroxyl group of the initiator required for initiation of the minimal polymerization. Optimizing the flexibility and mechanical properties of the final block copolymer and considering the minimal content required as the initiator of the ring-opening polymerization, the polysiloxane compound of Chemical Formula 3 may be preferably added in an amount of 1 to 50 parts by weight, more preferably 3 to 30 parts by weight, and most preferably 5 to 20 parts by weight, based on 100 parts by weight of the lactide monomer.

The polysiloxane compound of Chemical Formula 3 may have a number average molecular weight of 300 to 30,000 g/mol, and another polysiloxane compound having a different number average molecular weight within the above-described range may be mixed therewith for use. More preferably, the polysiloxane compound of Chemical Formula 3 may have a number average molecular weight of 1000 to 20,000 g/mol. If the polysiloxane compound of Chemical Formula 3 having a number average molecular weight within the above-described range is used, a polysiloxane-polylactide block copolymer having excellent physical properties can be obtained without deterioration of polymerization activity.

The ring-opening polymerization may be performed in the presence of a catalyst. In this regard, any typical catalyst may be used without limitation in its composition, as long as it is generally used in the preparation of polylactide resins by the ring-opening polymerization of lactide monomers. Preferred examples of the catalyst to be used in the ring-opening polymerization may include an organic metal complex catalyst of the following Chemical Formula 4, or a catalyst including a compound of the following Chemical Formula 5 and a compound of the following Chemical Formula 6:

[Chemical Formula 4]

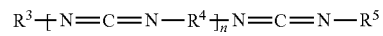
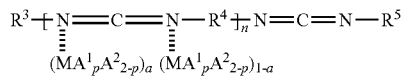

wherein n is an integer of 0 to 15; p is an integer of 0 to 2; a is 0 or 1; M is Sn or Zn; $R^3$ and $R^5$ are the same as or different from each other and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms; $R^4$ is substituted or unsubstituted alkylene having 3 to 10 carbon atoms, substituted or unsubstituted cycloalkylene having 3 to 10 carbon atoms, or substituted or unsubstituted arylene having 6 to 10 carbon atoms; and $A^1$ and $A^2$ are each independently an alkoxy group having 1 to 12 carbon atoms or a carboxyl group,

[Chemical Formula 5]

$$R^3 + N=C=N-R^4 +_n N=C=N-R^5$$

wherein n is an integer of 0 to 15; $R^3$ and $R^5$ are the same as or different from each other and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms; $R^4$ is substituted or unsubstituted alkylene having 3 to 10 carbon atoms, substituted or unsubstituted cycloalkylene having 3 to 10 carbon atoms, or substituted or unsubstituted arylene having 6 to 10 carbon atoms,

 [Chemical Formula 6]

wherein M is Sn or Zn, p is an integer of 0 to 2, and $A^1$ and $A^2$ are each independently an alkoxy group having 1 to 12 carbon atoms or a carboxyl group.

When the lactide ring-opening polymerization is performed in the presence of the organic metal complex catalyst or the catalyst including carbodiimide and an organic metal compound, depolymerization or degradation of the final block copolymer may be prevented, and a polysiloxane-polylactide block copolymer having a higher molecular weight and excellent mechanical properties can be obtained at a higher conversion rate.

Meanwhile, when the ring-opening polymerization is performed in the presence of the catalyst including the compounds of Chemical Formula 5 and 6, the compounds of Chemical Formula 5 and 6 may be added either simultaneously or sequentially with time intervals therebetween. They may also be added before addition of the lactide monomers or before initiation of the polymerization within a certain time, or added immediately before initiation of polymerization. However, it is preferable for the compounds of Chemical Formula 5 and 6 to be simultaneously added at a predetermined time before initiation of the polymerization, and then to add the monomers to initiate the polymerization, in order to allow a reaction between the compounds of Chemical Formula 5 and 6 to form a complex thereof.

Preferably, in the organic metal complex catalyst of Chemical Formula 4 and the compound of Chemical Formula 5, $R^3$ and $R^5$ are each independently a monovalent phenyl group substituted with an alkyl group having 1 to 10 carbon atoms, or an alkyl or cycloalkyl group having 3 to 10 carbon atoms; and $R^4$ is a bivalent phenylene group substituted with an alkyl group having 1 to 10 carbon atoms or an alkylene or cycloalkylene group having 3 to 10 carbon atoms. In addition, the compound of Chemical Formula 6 is preferably tin(II) 2-ethylhexanoate ($Sn(Oct)_2$) in order to reduce catalytic activity and depolymerization of the final block copolymer.

Further, in the preparation method of the polysiloxane-polylactide block copolymer, the organic metal complex catalyst of Chemical Formula 4 is added at a ratio of 0.001 to 0.1 mole, based on 100 moles of the lactide monomer, so as to perform the ring-opening polymerization. Each of the compounds of Chemical Formula 5 and 6 is added at a ratio of 0.001 to 0.1 mole, based on 100 moles of the lactide monomer, so as to perform the ring-opening polymerization. If the addition ratio of the catalyst is too low, the polymerization activity is not sufficient. On the other hand, if the addition ratio of the catalyst is too high, the residual amount of the catalyst in the prepared polysiloxane-polylactide block copolymer may increase to cause copolymer degradation or reduction in the molecular weight due to depolymerization such as trans-esterification.

Furthermore, in the preparation method of the polysiloxane-polylactide block copolymer, the polysiloxane compound of Chemical Formula 3 functions as an initiator, but an initiator containing a hydroxyl group-containing compound may be separately added to perform the polymerization. The initiator forms an actual active catalyst species by a reaction with the above-described organic metal complex catalyst of Chemical Formula 4 or the catalyst including the compounds of Chemical Formula 5 and 6, together with the polysiloxane compound of Chemical Formula 3, and thus functions to initiate the ring-opening polymerization of lactide monomers. Accordingly, the initiator and the polysiloxane compound of Chemical Formula 3 are used together with the above-described organic metal complex catalyst of Chemical Formula 4 or the catalyst including the compounds of Chemical Formula 5 and 6 so as to improve the activity of the catalyst, resulting in a higher conversion rate of the polysiloxane-polylactide block copolymer. Additionally, the initiator may be partially involved in depolymerization or degradation of the resin, and thus functions to control the molecular weight of the polylactide resin. Meanwhile, the additional initiator may be added independent of the polysiloxane compound of Chemical Formula 3. Thus, even though the polysiloxane compound of Chemical Formula 3 is used alone without the initiator, the ring-opening polymerization of lactide monomers occurs.

In this regard, a compound having a hydroxyl group may be used without limitation as an additional initiator, in addition to the polysiloxane compound of Chemical Formula 3. However, if the compound has 8 or less carbon atoms, it may be vaporized at the ring-opening polymerization temperature due to its low molecular weight, which makes it difficult for the initiator to be involved in the polymerization. Therefore, it is preferable that a hydroxyl group-containing compound having 8 or more carbon atoms is used as the initiator.

The initiator may be added at a ratio of 0.001 to 1 mole, based on 100 moles of the lactide monomer, so as to perform the ring-opening polymerization. If the addition ratio of the initiator is too low, the molecular weight of the resin obtained by the ring-opening polymerization is too high to perform a further process. If the addition ratio of the initiator is too high, the molecular weight of the resin may reduce.

Further, it is preferable for the ring-opening polymerization of lactide monomers to be practically performed by bulk polymerization using no solvent. In this regard, "practically using no solvent" may encompass use of a small amount of solvent to solubilize the catalyst, for example, a maximum of 1 ml or less per 1 Kg of the lactide monomer used.

As the ring-opening polymerization is performed by bulk polymerization, a process of removing the solvent can be omitted after polymerization, and thus degradation or loss of the resin attributed to the solvent removal process can be prevented. Owing to the bulk polymerization, the polysiloxane-polylactide block copolymer can be obtained at a high conversion rate and yield.

In addition, the ring-opening polymerization of lactide monomers may be performed at a temperature of 120 to 200° C. for 0.5 to 8 hours, and preferably 0.5 to 4 hours.

According to the aforementioned preparation method, the polysiloxane-polylactide block copolymer having excellent flexibility and mechanical properties can be prepared at a high conversion rate. The weight content, weight average molecular weight, tensile modulus, tensile strength, elongation, notched Charpy impact strength value, or the like of the polysiloxane repeating unit included in the polysiloxane-polylactide block copolymer prepared according to the method are the same as in the description of the polysiloxane-polylactide block copolymer according to the above-described embodiments.

The present invention provides a polysiloxane-polylactide block copolymer having excellent impact resistance and flexibility and a preparation method thereof, and thus the application fields of the polylactide resins mainly used for disposable products can be expanded to semi-permanent materials such as electronic packaging and car interior parts, in addition to the disposable products such as food packaging film, household products, and sheets.

EXAMPLES

Hereinafter, the actions and effects of the present invention will be described in more detail with reference to the specific examples. However, these examples are for illustrative purposes only, and the scope of the invention is not intended to be limited by these examples.

[Experimental Method]

In the following examples and comparative example, all manipulations of handling air- or water-sensitive compounds were carried out using a standard Schlenk or drybox technique.

Nuclear magnetic resonance spectra were obtained using a Bruker 600 spectrometer, and $^1$H NMR was measured at 600 MHz.

The molecular weight and molecular weight distribution of polymers were measured by GPC (gel permeation chromatography) using polystyrene standard samples.

Comparative Example 1

Preparation of Polylactide Resin

An extrusion grade 4032D, which is one of polylactides manufactured by NatureWorks, was used as Comparative Example 1. The residual amount of lactide was 0.17%, the weight average molecular weight was 214,000 g/mol, the resin had the feature of translucent pellets, and post-processing was not performed before use.

Example 1

Preparation of Polysiloxane-Polylactide Block Copolymer 1

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, 50 g of an organic polysiloxane Q3563 (Dow Corning, Mn=3500 g/mol), 0.07 g of Sn(Oct)$_2$ (Sigma-Aldrich, Mw=405.1 g/mol), and 2 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 93.1%, and a weight average molecular weight of 141,000 g/mol.

Example 2

Preparation of Polysiloxane-Polylactide Block Copolymer 2

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, as the organic polysiloxane, 40.1 g of Q3563 (Dow Corning, Mn=3500 g/mol) and 10 g of RF700 (Shinetsu, Mn=16,500 g/mol), 0.07 g of $Sn(Oct)_2$ (Sigma-Aldrich, Mw=405.1 g/mol), and 1 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 93.5%, and a weight average molecular weight of 150,000 g/mol.

Example 3

Preparation of Polysiloxane-Polylactide Block Copolymer 3

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, as the organic polysiloxane, 31.6 g of Q3563 (Dow Corning, Mn=3500 g/mol) and 50 g of RF700 (Shinetsu, Mn=16,500 g/mol), 0.07 g of $Sn(Oct)_2$ (Sigma-Aldrich, Mw=405.1 g/mol), and 1 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 94.1%, and a weight average molecular weight of 148,000 g/mol.

Example 4

Preparation of Polysiloxane-Polylactide Block Copolymer 4

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, 100 g of an organic polysiloxane RF700 (Shinetsu, Mn=16,500 g/mol), 0.14 g of $Sn(Oct)_2$ (Sigma-Aldrich, Mw=405.1 g/mol), and 2 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 95.5%, and a weight average molecular weight of 266,000 g/mol.

Example 5

Preparation of Polysiloxane-Polylactide Block Copolymer 5

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, as the organic polysiloxane, 100 g of RF700 (Shinetsu, Mn=16,500 g/mol) and 21.1 g of Q3563 (Dow Corning, Mn=3500 g/mol), 0.07 g of $Sn(Oct)_2$ (Sigma-Aldrich, Mw=405.1 g/mol), and 1 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 94.0%, and a weight average molecular weight of 142,000 g/mol.

Example 6

Preparation of Polysiloxane-Polylactide Block Copolymer 6

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, as the organic polysiloxane, 150 g of RF700 (Shinetsu, Mn=16,500 g/mol) and 10.4 g of Q3563 (Dow Corning, Mn=3500 g/mol), 0.07 g of $Sn(Oct)_2$ (Sigma-Aldrich, Mw=405.1 g/mol), and 1 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 94.2%, and a weight average molecular weight of 154,000 g/mol.

Example 7

Preparation of Polysiloxane-Polylactide Block Copolymer 7

1 kg of a solid L-lactide monomer (6.9 mol) that was maintained at acidity of 50 meq KOH/kg or less and at a moisture content of 200 ppm or less was injected into a 2 L stirred tank reactor, and moisture and oxygen were sufficiently removed from the monomers and reactor under vacuum. Subsequently, 200 g of an organic polysiloxane RF700 (Shinetsu, Mn=16,500 g/mol), 0.07 g of $Sn(Oct)_2$ (Sigma-Aldrich, Mw=405.1 g/mol), and 1 g of carbodiimide (Reine Chem, Mn=3000 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polysiloxane-polylactide block copolymer strand was finally obtained. The resin had a conversion rate of 94.3%, and a weight average molecular weight of 187,000 g/mol.

Meanwhile, the basic physical properties (weight average molecular weight) of the polylactide according to the comparative example, preparation conditions (injection ratio of polysiloxane, content of polysiloxane included in block copolymer, and conversion rate) of the polysiloxane-polylactide block copolymers according to the examples, and the basic physical properties (content of polysiloxane included in block copolymer and weight average molecular weight) of the polysiloxane-polylactide block copolymers according to the examples are the same as in the following Table 1.

Experimental Example 1

Measurement (Calculation) of Polysiloxane Content in Polysiloxane-Polylactide Block Copolymers According to Examples The contents of polysiloxane repeating unit in the polysiloxane-polylactide block copolymers according to Examples 1 to 7 were measured using Varian 500 1H NMR, and the results are shown in Tables 1 and 2.

Meanwhile, a hydrogen peak of terminal hydroxyl group (—OH) of polysiloxanol was observed around a chemical shift of 2 ppm in the $^1H$ NMR spectrum of pure polysiloxane, but no hydrogen peak of a terminal hydroxyl group (—OH) of polysiloxanol was observed in those of the polysiloxane-polylactide block copolymer resins according to Examples 1 to 7. That is, the —OH peak was not observed in the block copolymer resins of the examples, indicating that all of the polysiloxanol injected was involved in the reaction and thus copolymerized with polylactide. Therefore, the content of polysiloxane included in the polysiloxane-polylactide block copolymer can be calculated from the content of polysiloxane injected. Meanwhile, $^1H$ NMR was measured after completely dissolving 5 mg of each polymer resin in 2 ml of $CDCl_3$ without additional pretreatment.

TABLE 1

| | Injection ratio of polysiloxane (Q3563/RF700) | Content of polysiloxane (wt %)[Note] | Conversion rate (%) | Polysiloxane content in block copolymer (wt %) | Weight average molecular weight of block copolymer (g/mol) |
|---|---|---|---|---|---|
| Comparative Example 1 | — | — | — | 0 | 214,000 |
| Example 1 | 100/0 | 5 | 93.1 | 5 | 141,000 |
| Example 2 | 80/20 | 5 | 93.5 | 5 | 150,000 |
| Example 3 | 40/60 | 8 | 94.1 | 8 | 148,000 |
| Example 4 | 0/100 | 10 | 95.5 | 10 | 266,000 |
| Example 5 | 17/83 | 12 | 94.0 | 12 | 142,000 |
| Example 6 | 6/94 | 16 | 94.2 | 16 | 154,000 |
| Example 7 | 0/100 | 20 | 94.3 | 20 | 187,000 |

[Note]The content of polysiloxane is represented by wt % of the used polysiloxane to the lactide monomers that are used in ring-opening polymerization.

Experimental Example 2

Measurement of Tensile Properties of Polysiloxane-Polylactide Block Copolymers

In order to evaluate flexibility of the polysiloxane-polylactide copolymer resins prepared in Examples, their tensile properties were measured. Samples for tensile property test were prepared using a Haake MiniJet injection molder, and they were dog-bone-type samples with a thickness of 3 mm. The injection temperature was 205° C., and the injection pressure was 250 bar. The tensile modulus, tensile strength, and elongation were measured according to ASTM D638.

Meanwhile, the measured tensile strength, elongation, and tensile modulus of Comparative Example 1 and Examples 1 to 7 are shown in the following Table 2.

Experimental Example 3

Measurement of Impact Strength of Polysiloxane-Polylactide Block Copolymers

To evaluate brittleness, notched Charpy impact strength of the comparative example and examples was measured. Samples for impact strength test were prepared using a Haake MiniJet injection molder, and they were rectangular bars with a thickness of 3 mm. The injection temperature was 205° C., and the injection pressure was 250 bar. The notched Charpy impact strength was measured according to ASTM D256, and the results are shown in the following Table 2.

TABLE 2

| | Polysiloxane content in block copolymer (wt %) | Tensile modulus (GPa) | Tensile strength (kg/cm²) | Elongation (%) | Notched Charpy impact strength (Kgf·m/m) |
|---|---|---|---|---|---|
| Comparative Example 1 | 0 | 2.8 | 742 | 2.7 | 2.4 |
| Example 1 | 5 | 2.4 | 574 | 5.7 | 2.4 |
| Example 2 | 5 | 2.5 | 588 | 2.3 | 3.7 |
| Example 3 | 8 | 2.2 | 496 | 2.2 | 7.8 |
| Example 4 | 10 | 2.5 | 513 | 2.1 | 9.6 |
| Example 5 | 12 | 2.0 | 453 | 2.0 | 14.2 |
| Example 6 | 16 | 1.8 | 389 | 2.3 | 21.0 |
| Example 7 | 20 | 1.4 | 316 | 5.7 | 26.8 |

As shown in Table 2, as the content of polysiloxane injected into the ring-opening polymerization was increased, the tensile modulus of the resins was gradually reduced and therefore their tensile strength was also reduced, while there was no great change in their elongation. In particular, the tensile modulus of Example 7 was 50% of that of Comparative Example 1, and its tensile strength was greatly reduced to 43%. The low tensile modulus means that the specimen can be stretched by a small force, indicating increased flexibility of the resin. That is, when the polysiloxane-polylactide block copolymer is prepared by the addition of polysiloxane during the polymerization of lactide monomers, flexibility of the polylactide resin can be highly improved. As shown in the examples of the present invention, it can be seen that the polysiloxane content is controlled to prepare the polylactide resins having various ranges of flexibility.

As described in Experimental Example 1, the polysiloxane-polylactide block copolymer resins of the examples of the present invention were found to have greatly improved flexibility, compared to the conventional pure polylactide resins. The increase in the resin flexibility is expected to greatly reduce brittleness, which is the one major drawback found in the production of film or sheet products. Brittleness of resin can be represented by impact strength, in which high impact strength means low brittleness.

As shown in Table 2, it was found that the polysiloxane-polylactide block copolymers showed higher impact strength than the pure polylactide resin, and the value of impact strength linearly increased depending on the content of polysiloxane injected to the ring-opening polymerization. In particular, the polysiloxane-polylactide block copolymer of Example 7 that was prepared by injection of 20% by weight of polysiloxane based on the weight of lactide monomer had impact strength of 26.8 Kgf·m/m, which is 11 times higher than that of the pure polylactide resin of Comparative Example 1.

Taken together, the polysiloxane-polylactide block copolymers prepared by the examples exhibit excellent flexibility and improved mechanical properties, and therefore the problems of the polylactide resins of the prior art can be improved. Expectedly, their application field can be expanded.

What is claimed is:

1. A preparation method of a polysiloxane-polylactide block copolymer, comprising the step of ring-opening polymerization of lactide monomers in the presence of a polysiloxane compound of the following Chemical Formula 3 wherein the ring-opening polymerization of lactide monomers is performed in the presence of an organic metal complex catalyst of the following Chemical Formula 4 or in the presence of catalyst comprising a combination of Chemical Formulas 5 and 6:

[Chemical Formula 3]

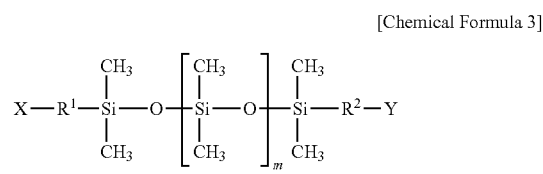

wherein m is an integer of 5 to 150,
$R^1$ and $R^2$ are the same as or different from each other, and are each independently substituted or unsubstituted alkyl having 3 to 10 carbon atoms, substituted or unsubstituted cycloalkyl having 3 to 10 carbon atoms, or substituted or unsubstituted aryl having 6 to 10 carbon atoms, and
X and Y are each independently an alkoxy group having 1 to 12 carbon atoms or a hydroxyl group;

[Chemical Formula 4]

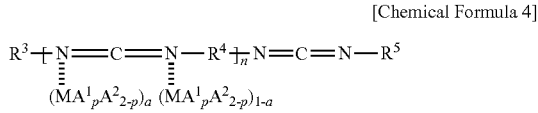

wherein n is an integer of 0 to 15; p is an integer of 0 to 2; a is 0 or 1; M is Sn or Zn; $R^3$ and $R^5$ are the same as or different from each other, and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms; $R^4$ is substituted or unsubstituted alkylene having 3 to 10 carbon atoms, substituted or unsubstituted cycloalkylene having 3 to 10 carbon atoms, or substituted or unsubstituted arylene having 6 to 10 carbon atoms; and $A^1$ and $A^2$ are each independently an alkoxy group having 1 to 12 carbon atoms or a carboxyl group;

[Chemical Formula 5]

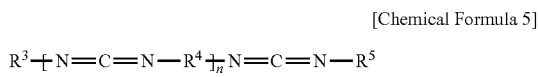

wherein n is an integer of 0 to 15; $R^3$ and $R^5$ are the same as or different from each other, and are each independently hydrogen, substituted or unsubstituted alkyl having 3 to 10 carbon atoms, substituted or unsubstituted cycloalkyl having 3 to 10 carbon atoms, or substituted or unsubstituted aryl having 6 to 10 carbon atoms;
$R^4$ is substituted or unsubstituted alkylene having 3 to 10 carbon atoms, substituted or unsubstituted cycloalkylene having 3 to 10 carbon atoms, or substituted or unsubstituted arylene having 6 to 10 carbon atoms;

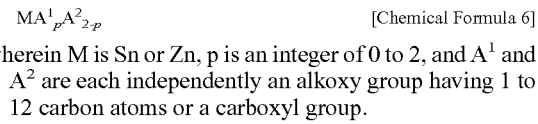

wherein M is Sn or Zn, p is an integer of 0 to 2, and $A^1$ and $A^2$ are each independently an alkoxy group having 1 to 12 carbon atoms or a carboxyl group.

2. The preparation method of the polysiloxane-polylactide block copolymer according to claim 1, wherein the polysiloxane compound of Chemical Formula 3 is added in an amount of 1 to 50 parts by weight, based on 100 parts by weight of the lactide monomer.

3. The preparation method of polysiloxane-polylactide block copolymer according to claim 1, wherein the polysiloxane compound of Chemical Formula 3 has a number average molecular weight of 300 to 30,000 g/mol.

4. The preparation method of the polysiloxane-polylactide block copolymer according to claim 1, wherein $R^3$ and $R^5$ are each independently a monovalent phenyl group substituted with an alkyl group having 1 to 10 carbon atoms, or an alkyl or cycloalkyl group having 3 to 10 carbon atoms, and $R^4$ is a bivalent phenylene group substituted with an alkyl group having 1 to 10 carbon atoms or an alkylene or cycloalkylene group having 3 to 10 carbon atoms.

5. The preparation method of the polysiloxane-polylactide block copolymer according to claim 1, wherein $MA^1_p A^2_{2-p}$ is tin(II) 2-ethylhexanoate(Sn(Oct)$_2$).

6. The preparation method of the polysiloxane-polylactide block copolymer according to claim 1, wherein the organic metal complex catalyst of Chemical Formula 4 is added at a ratio of 0.001 to 0.1 mole, based on 100 moles of the lactide monomer.

7. The preparation method of polysiloxane-polylactide block copolymer according to claim 1, wherein each of the compounds of Chemical Formula 5 and 6 is added at a ratio of 0.001 to 0.1 mole, based on 100 moles of the lactide monomer.

8. The preparation method of polysiloxane-polylactide block copolymer according to claim 1, wherein an initiator including a hydroxyl-containing compound is added at a ratio of 0.001 to 1 mole, based on 100 moles of the lactide monomer, so as to perform the ring-opening polymerization.

9. The preparation method of the polysiloxane-polylactide block copolymer according to claim 1, wherein the ring-opening polymerization is performed by bulk polymerization.

10. The preparation method of the polysiloxane-polylactide block copolymer according to claim 1, wherein the ring-opening polymerization is performed at a temperature of 120 to 200° C. for 0.5 to 8 hours.

* * * * *